Sept. 19, 1967          K. T. BARKEY          3,342,782
POLYESTER PREPOLYMERS AND PROCESSES FOR THEIR MANUFACTURE
Filed Jan. 30, 1967          8 Sheets-Sheet 5
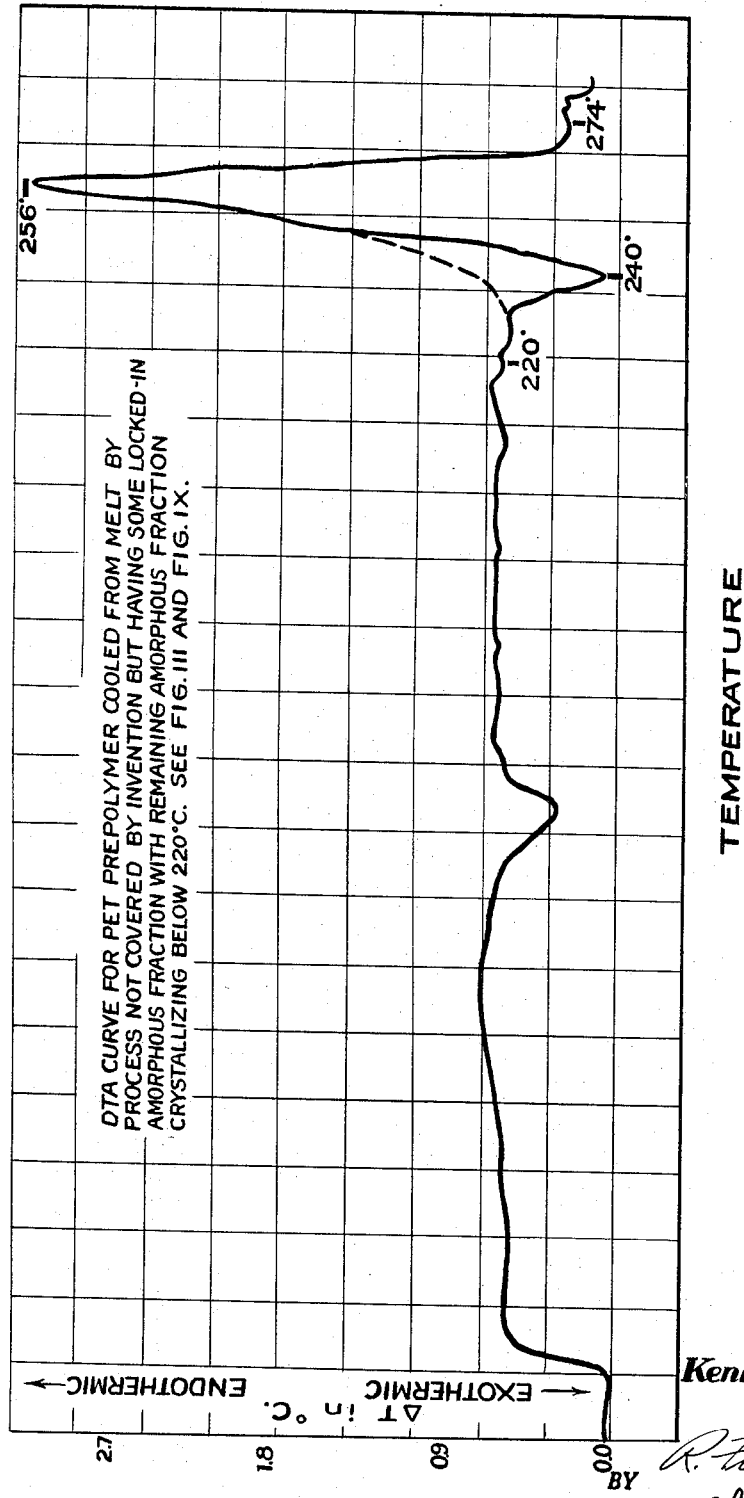
Kenneth T. Barkey
INVENTOR.
ATTORNEYS

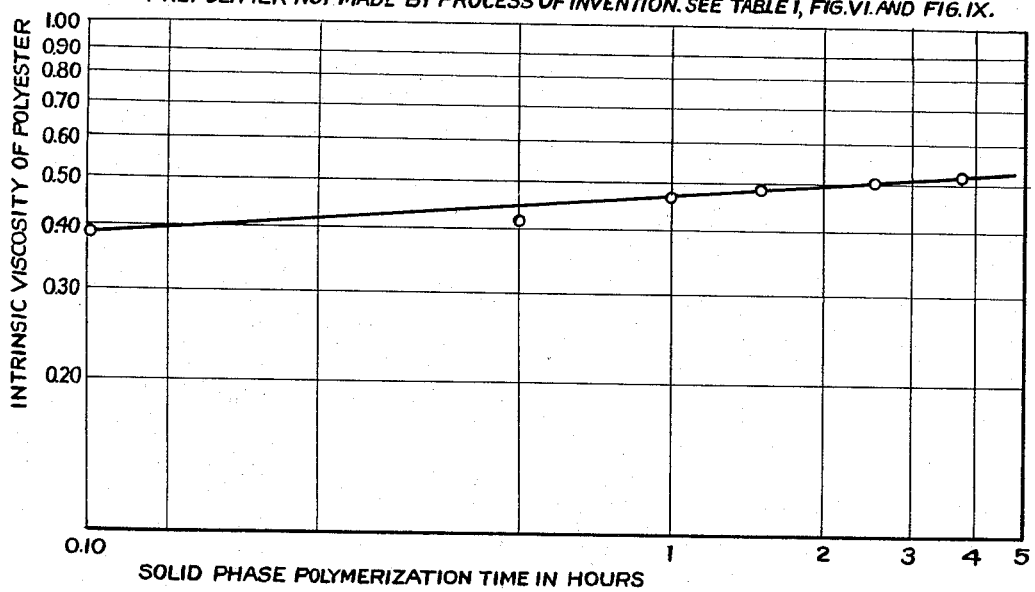
*Fig. III*
BUILD-UP RATE FOR SOLID PHASE POLYMERIZATION OF PET PREPOLYMER NOT MADE BY PROCESS OF INVENTION. SEE TABLE I, FIG.VI. AND FIG. IX.
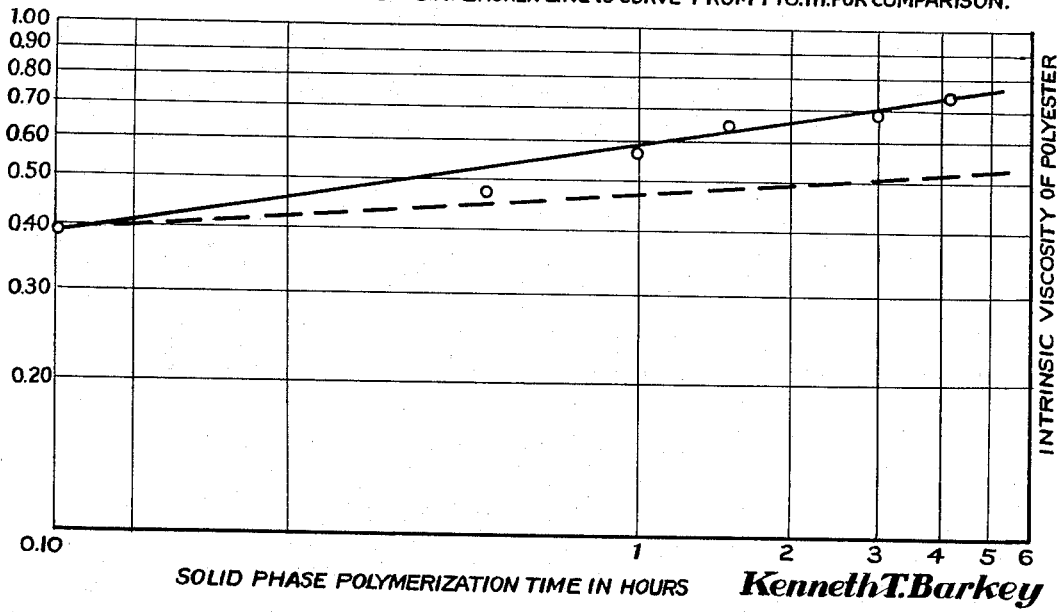
*Fig. V*
BUILD-UP RATE FOR SOLID PHASE POLYMERIZATION OF PET PREPOLYMER HAVING ENLARGED LOCKED-IN AMORPHOUS FRACTION. SEE TABLE II AND FIG. IV. BROKEN LINE IS CURVE FROM FIG. III. FOR COMPARISON.

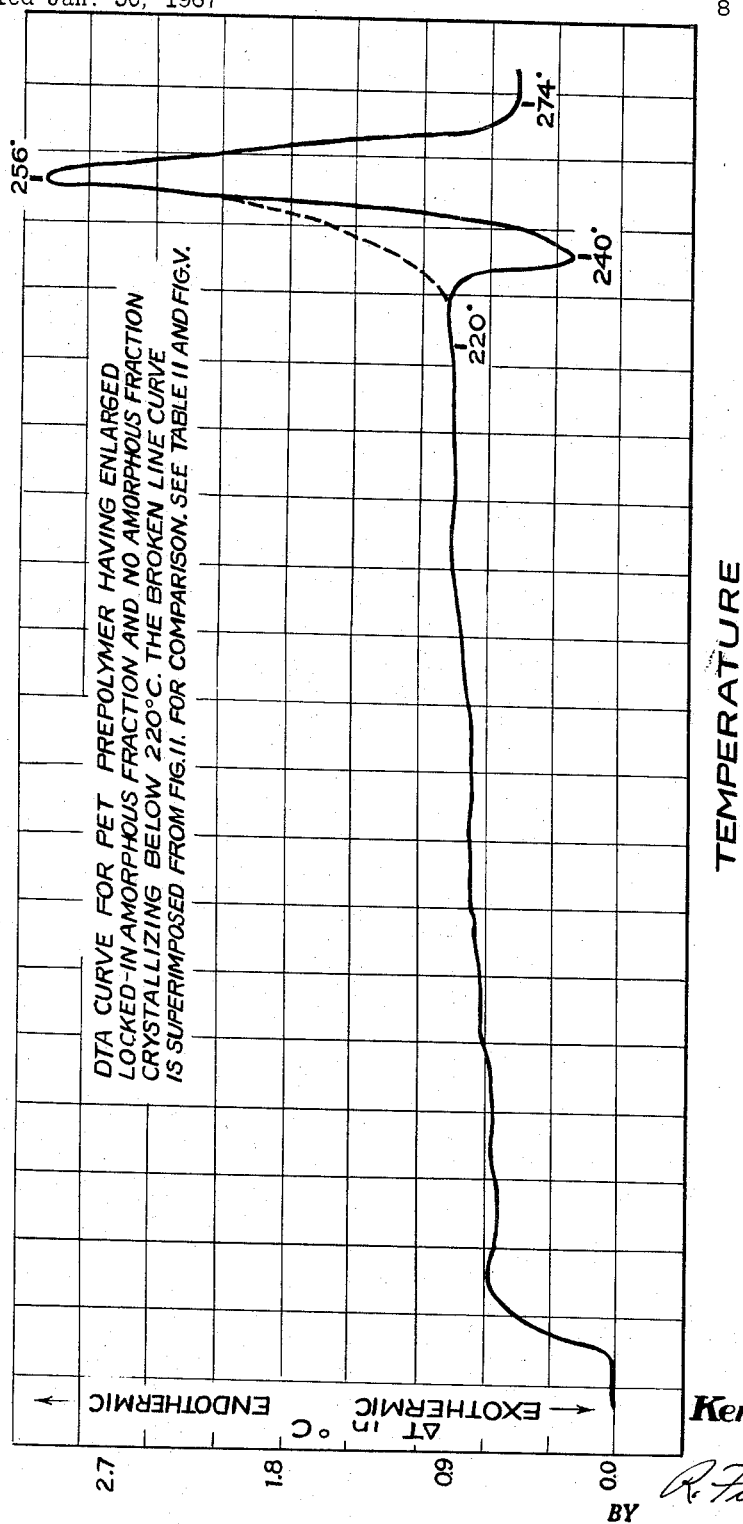

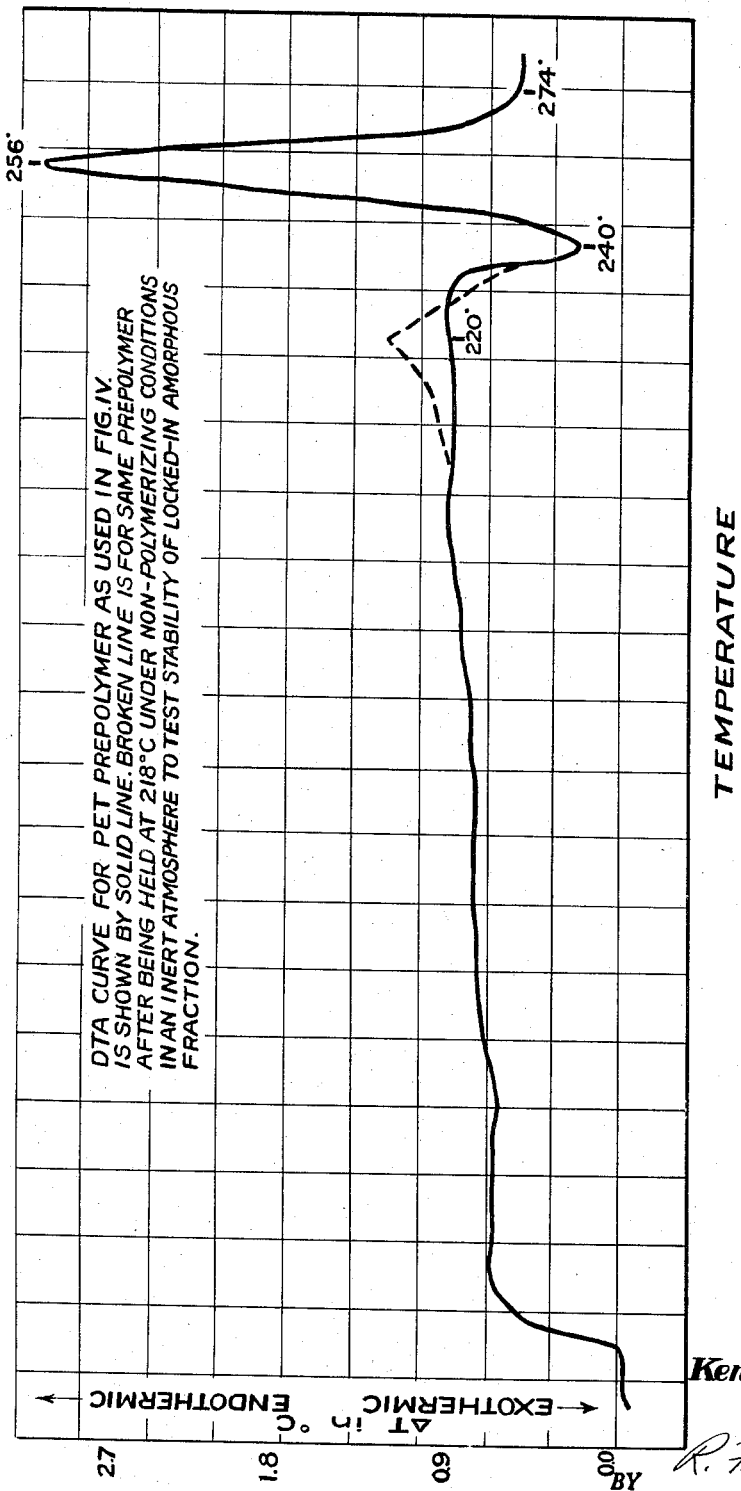

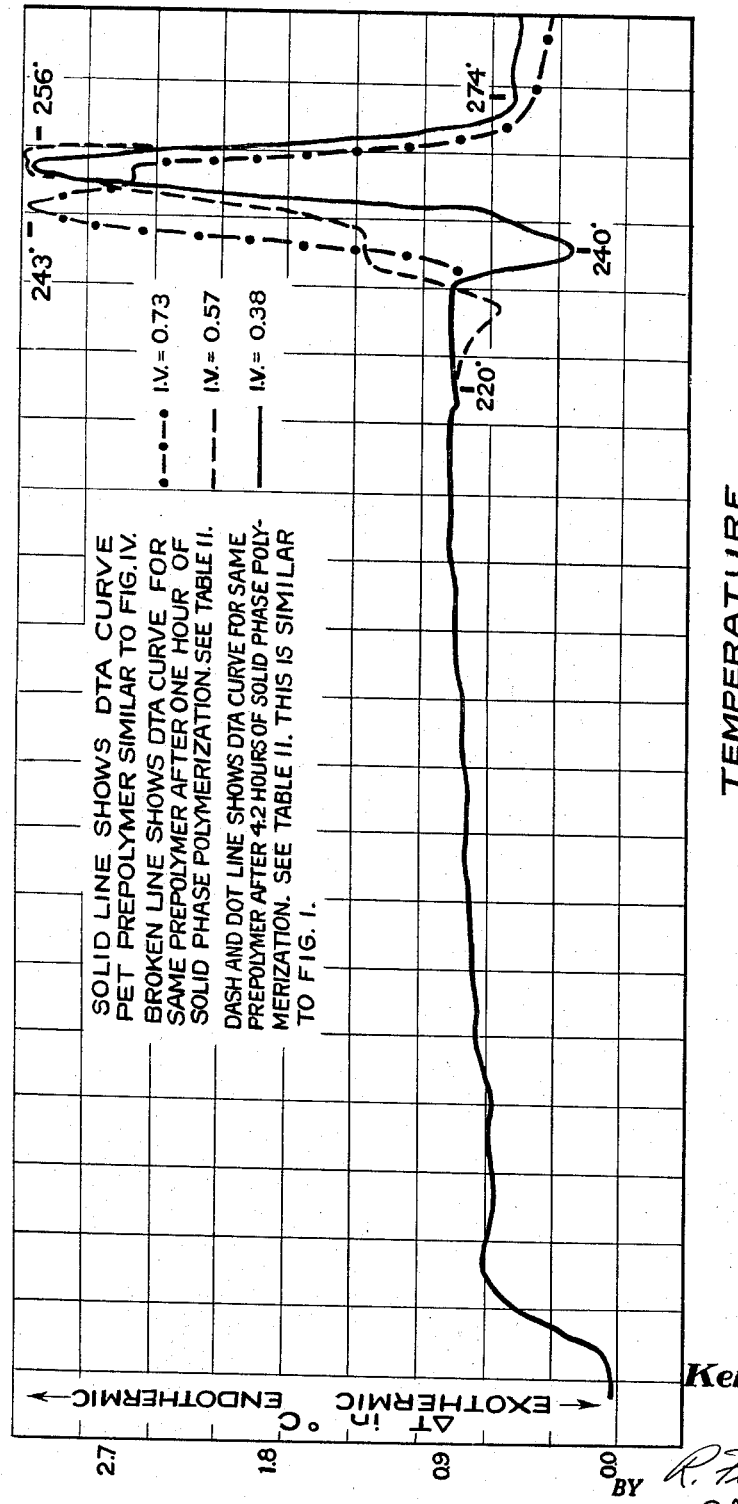

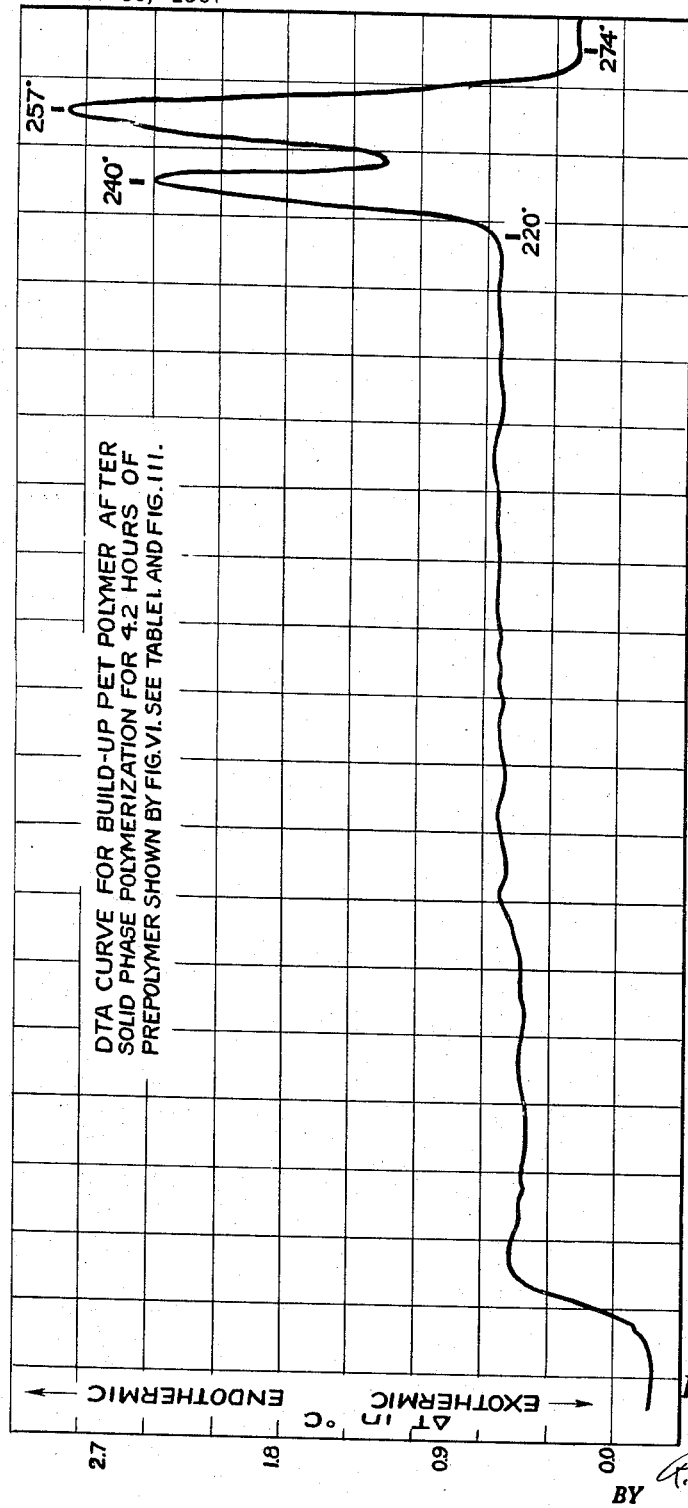

United States Patent Office 3,342,782
Patented Sept. 19, 1967

3,342,782
POLYESTER PREPOLYMERS AND PROCESSES
FOR THEIR MANUFACTURE
Kenneth T. Barkey, Rochester, N.Y., assignor to Eastman Kodak Company, Rochester, N.Y., a corporation of New Jersey
Filed Jan. 30, 1967, Ser. No. 621,091
6 Claims. (Cl. 260—75)

ABSTRACT OF THE DISCLOSURE

By cooling (solidifying) molten polyester prepolymer in a carefully controlled manner, the resulting prepolymer product has an increased rate of reactivity when it is subsequently subjected to solid phase polymerization.

---

Figure 1:
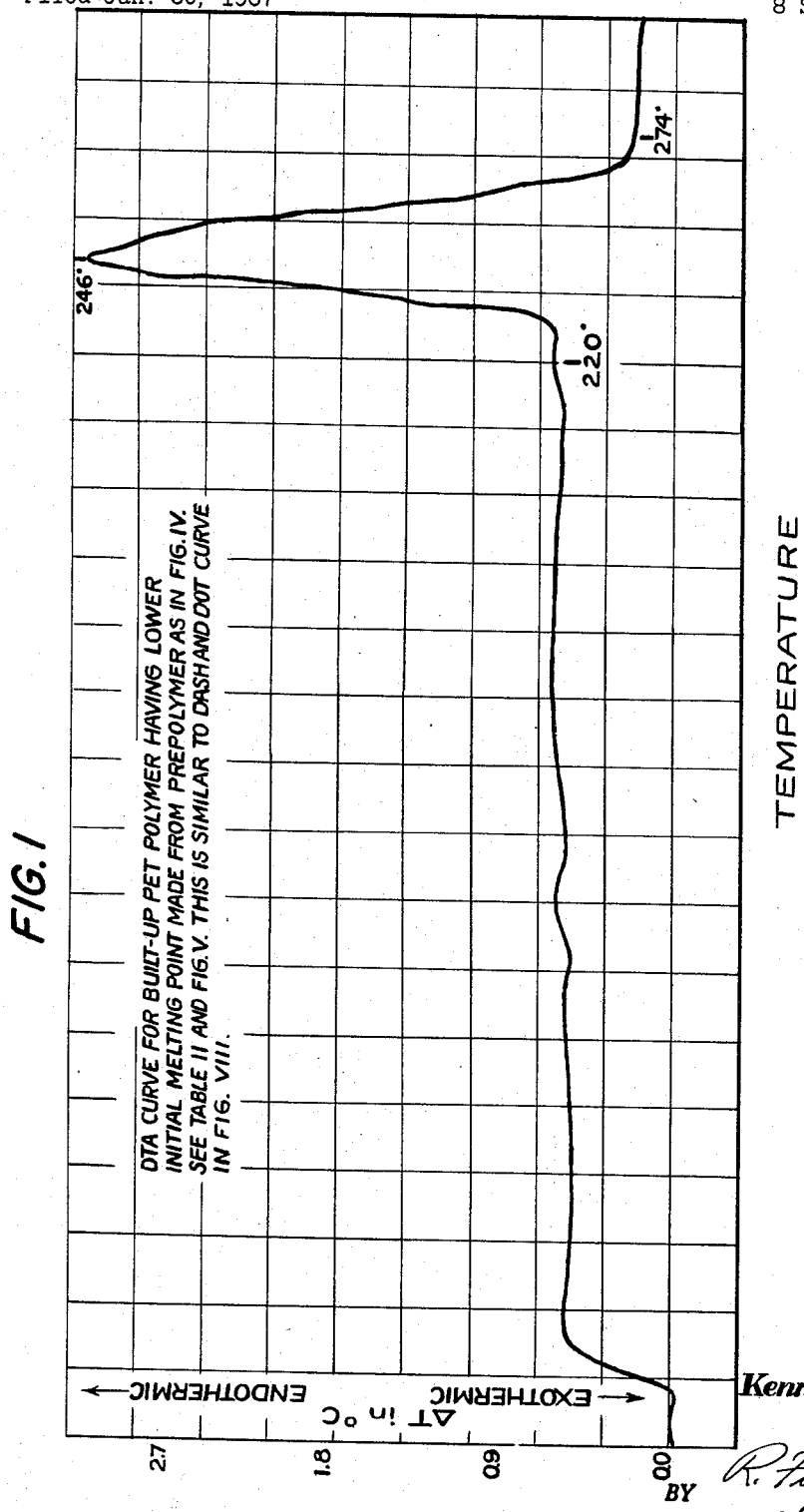
Figure 2:
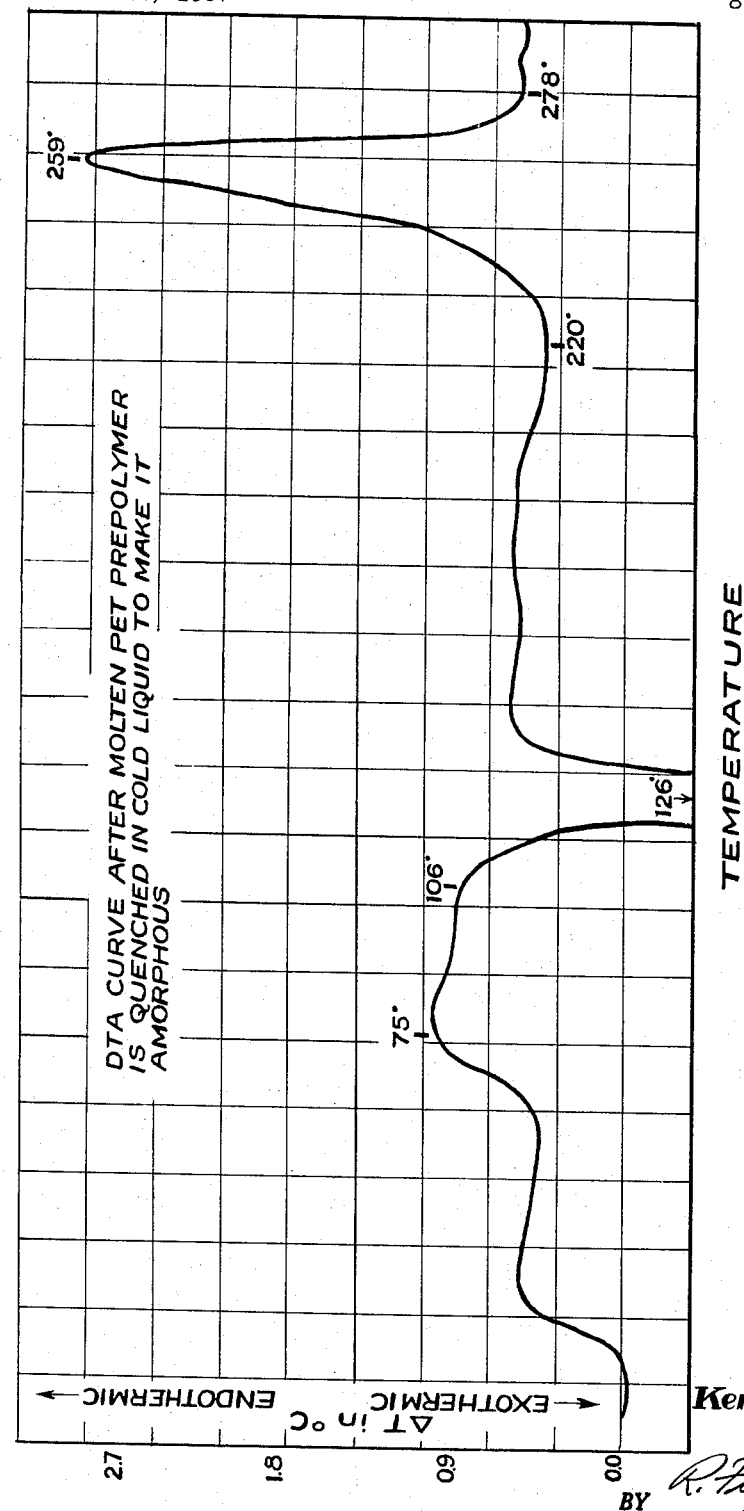

This application is a continuation-in-part of U.S. patent application Ser. No. 522,005, filed Dec. 3, 1965, which in turn was a continuation-in-part of U.S. patent application Ser. No. 97,063, filed Mar. 20, 1961.

This invention relates to new and improved polyesters having intermediate as well as high molecular weights and to new and improved processes for forming such polyesters. In particular, the invention relates to poly(ethylene terephthalate) and its preparation but the discoveries upon which it is based pertain to all linear polymers melting above about 150° C. and which are composed of bifunctional dicarboxylic acid and glycol constituents.

In the preparation of such polymers there is generally first formed a relatively low molecular weight polymer often referred to as "monomer" which has an average degree of polymerization of about 4 or perhaps less. This monomer is conventionally prepared by an ester exchange reaction which comprises condensing a lower dialkyl ester of a dicarboxylic acid or acids with a stoichiometric excess of a glycol or glycols until most of the dialkyl ester has been converted to glycol esters and low polyesters. Such conversion is indicated by the degree of consumption of the theoretically available alkanol. This condensate which can be called monomer has also been referred to as protopolymer. Neither term however is especially apt. Further heating under conditions facilitating removal of glycol then leads to a gradual increase in molecular weight. At intermediate stages such as at molecular weight ranges of from about 2,000 to about 10,000, the polymer is often spoken of as prepolymer. The intrinsic viscosity of poly(ethylene terephthalate) prepolymers normally ranges from about 0.1 to about 0.55. The final build-up is usually carried to a molecular weight of at least 14,000–50,000 or higher. This corresponds to an intrinsic viscosity of 0.5 to 1.5 or more for poly(ethylene terephthalate).

In the manufacture of poly(ethylene terephthalate), dimethyl terephthalate is reacted with ethylene glycol to produce a mixture of methanol, bis($\beta$-hydroxyethyl terephthalate) and low molecular weight polymers. This ester interchange reaction is catalyzed by any of the well known catalysts previously disclosed in patents and other prior art, such as divalent zinc ion added as the acetate salt. At the completion of the ester exchange reaction, and in the presence of a polymerization catalyst such as antimony trioxide, the polymerization reaction can be continued by increasing the reaction temperature and lowering the pressure. This allows the ethylene glycol to be removed from the equilibrium reaction mixture to give a polymer of increasing molecular weight.

It has been customary for those skilled in the art to continue the melt polymerization reaction until the molecular weight of the polymer has attained a prescribed useful value. Ordinarily, this value is expressed as an intrinsic viscosity value defined by the equation $$(\eta) = \frac{ln(\eta/\eta_0)}{C} = \text{I.V.}$$

where $\eta_0$ and $\eta$ are the respective viscosities of pure solvent and of a solution containing C grams of polymer per 100 cc. of solvent. The logarithmic intrinsic viscosity numbers reported herein were measured in a 60:40 mixture by weight of phenolchlorobenzene at a polymer concentration of about 0.25 gram per 100 cc. of solvent mixture, at a temperature of 25° C.

For those skilled in the art, it is known that the final intrinsic viscosity of the extruded poly(ethylene terephthalate) must be higher than about 0.5 in order to obtain the advantageous physical properties achieved by stretching and heat setting the material for dimensional stability.

The intrinsic viscosity values for other polyesters correspond to somewhat different molecular weights. For example, poly(1,4-cyclohexanedimethylene terephthalate) has somewhat higher intrinsic viscosity measurements for any given molecular weight than does poly(ethylene terephthalate). The following discussion is, for illustrative purposes only, directed specifically to poly(ethylene terephthalate) although it is obvious that the process of the invention is similarly applicable to any polymer of this general type.

Poly(ethylene terephthalate), held above its melting point, undergoes thermal degradation which increases in rate as the temperature is increased. In the presence of oxygen, oxidation also occurs and is also accelerated by higher temperatures. Although the polymerization reaction rate, within limits, increases with temperature, the time necessary to produce a polymer of sufficient molecular weight for commercial application is such that prior to this invention colored products resulted which have seriously affected some uses of the polymer. Changing the catalyst and/or adding a color stabilizer have been suggested as means for improving the color. Each is partially successful. The fact, however, that patents continue to be issued on this subject is ample evidence of the fact that there has been no complete solution to this problem.

It is known that polyesters may be prepared by a conventional continuous melt polymerization process wherein the build-up of prepolymer is merely continued as an extension o fthe melt preparation of the prepolymer. It is further known that solid phase (i.e., powder) polymerization techniques can be utilized to obviate certain defects of the melt polymerization process, such as the high temperatures involved therein, which produce products of unsatisfactory color. Since powder polymerization techniques are utilized at temperatures below the melting point of the prepolymer, thermal degradation and the resultant discoloring are greatly reduced. The main defect in the powder polymerization technique has been, however, the low order of reactivity which was thought to be inherent therein and the overly long reaction times necessitated thereby.

It has now been unexpectedly found that the previous history of low reactivity of prepolymer in a solid phase, i.e., powder polymerization, process has been misunderstood by those skilled in the art and that low reactivity is not necessarily an inherent limitation of the powder process. In accordance with the discoveries which led to the present invention, it was found that the low order of reactivity previously believed to be an inherent characteristic of solid phase polymerization was, in fact, due to the relatively low reactivity of the prepolymer, produced by the melt process, which was subsequently built up to a high intrinsic viscosity in the solid phase.

In the light of the background set forth above, this invention provides a unique integrated process for the melt phase preparation of prepolymer and its subsequent build-up in the solid phase. The intgerated process of the invention results in an improved "total-reaction" concept of obtaining prepolymer of heightened reactivity and provides a method for treating such prepolymer to additionally increase its reactivity and thus provide a final built-up product characterized by a suitably high intrinsic viscosity, e.g., above a minimal range of 0.5 to 0.55 and preferably in the range of 0.70 to 0.80, and capable of being produced at a rate which is sufficiently rapid to avoid excessive thermal degradation.

It is to be understood that the present invention is not directed to the mere application of solid phase polymerization techniques to conventional melt-produced prepolymers. It is, rather, the essence of the invention to make possible a particularly efficacious method of producing prepolymer having a minimum concentration of contaminating side reaction products and to treat the prepolymer thereby obtained in a novel and unobvious manner in order ot obtain a prepolymer having a higher order of reactivity than heretofore known.

Thus, the process of this invention is readily distinguishable from the conventional solid phase polymerization of polyesters, such as poly(ethylene terephthalate), wherein the prepolymer melt is cooled, reduced in particle size and then subjected to solid phase polymerization at a temperature below the melting point of the material. In such process, it has logically been considered necessary that the prepolymer be cooled rapidly, to prevent thermal degradation and oxidation of the hot prepolymer, in order to produce a material which can be easily comminuted. One such method to accomplish this has been to immerse the hot melt in cold water (i.e., quenching); another method has been to cast the prepolymer melt onto a cold surface and spray it with water. The material can then be reduced in size by conventional means of grinding, followed by drying. The resultant powder can then be heated in an evacuated vessel at about 200–230° C., e.g. 218° C., or subjected to hot gases, vapors or liquids to remove the glycol as further polymerization takes place. The physical state of the final powder obtained by such a process is, however, essentially the same as that of the original prepolymer. Those skilled in the art have thought that the best practice was to cool the prepolymer melt as quickly as possible (quench it) so as to obtain a highly frangible mass. This invention is, in part, based on the discovery that such is not the case.

Accordingly, it is an object of this invention as to any such polymer described above, to provide an integrated batch process for preparing and treating prepolymer so as to obtain a novel, highly reactive prepolymer.

It is a further object of this invention to provide a method for treating a prepolymer in such a manner that the amorphous and crystalline phases thereof may be varied and to thereby control the reactivity of the prepolymer in order to obtain a novel final (i.e. high molecular weight) product having unique characteristics.

Another object of the invention is to provide a novel prepolymer characterized by minimum discoloration, by high reactivity when subjected to solid phase polymerization, by a physical state comprising a combination of a crystalline phase and an amorphous phase and by having a crystalline melting point which is significantly lower than the normal "characteristic" or "equilibrium" melting point of the prepolymer.

A further object of the invention is to provide a built-up polymer characterized by having a melting point above 150° C., by being orientable, by being crystallizable, by being capable of formation into filaments which when cold drawn exhibit molecular orientation along the fiber axis and by exhibiting a melting point lower than the normally measured value for such polymer.

According to this invention, it has been discovered, contrary to prior concepts as generally indicated above, that the reactivity of a polyester prepolymer, when subjected to solid phase (i.e. powder) polymerization, is dependent on the following interrelated factors:

(A) The manner of carrying out and controlling the ester exchange and melt polymerization reactions;

(B) The intrinsic viscosity (i.e. I.V.) of the prepolymer; and (C) The thermal treatment of the prepolymer during melt polymerization and particularly the cooling treatment of the prepolymer immediately prior to powder polymerization.

GENERAL

In the ordinary continuation of the ester exchange reaction to produce a high molecular weight polyester, it is known that if the melt polymerization of the prepolymer is continued beyond an intrinsic viscosity of about 0.43, the removal of glycol becomes increasingy difficult due to the higher melt viscosity of the reaction mixture and the degree of polymerization of the reaction. Thus, at polymerization temperatures of 275–289° C., the thermal degradation and color of the prepolymer increases markedly because of the glycol retention. On the other hand, if the melt polymerization is stopped at a point in time when the melt viscosity is relatively low and the removal of glycol is still reasonably rapid, little color is introduced into the prepolymer.

Poly(ethylene terephthalate) or its prepolymer can be characterized by various analyses; e.g., catalyst concentration, melting point, intrinsic viscosity, percent methoxyl, percent combined diethylene glycol, etc. When, however, it was discovered that certain prepolymers had enhanced reactivity, none of these conventional tests appeared to explain the large reactivity rate differences (i.e. increase) observed during solid phase polymerization. It was found then that the technique of differential thermal analysis can be utilized to measure and graphically display differences between prepolymers of high and low reactivity.

Differential thermal analysis (DAT) is a relatively new analytical method that has been found to be very useful for characterizing phase transitions of various materials. Two units are compared. One unit comprises a small sample of the substance to be evaluated with respect to an inert reference medium such as sand. Another unit, without the sample of the substance to be evaluated, serves as a base standard. A differential thermocouple is immersed in each unit. As the two units are heated at a constant rate; e.g., approximately 2.5° C. per minute, the difference in temperature between the two units is amplified, recorded and graphically plotted as a function of the bath temperature. Heat is evolved when crystallization occurs in the amorphous fractions of the sample material, such as poly(ethylene terephthalate). This heat evolution phenomenon is indicated by a dip in the curve, obtained by plotting the temperature differentials, from that of the base line. When the polymer sample is merely being heated, while behaving in a manner similar to the inert sand, there is no change observed from the base line. When the sample starts to melt, however, heat is absorbed by the polymer. This absorption of heat (i.e. endotherm) is shown by a movement of the curve upward from the base line. When an exothermic change takes plate (e.g. during crystallization), the heat given up is shown by an area below the base line. The DTA melting point of the sample can be conveniently considered to be the peak of the curve. Further information as to DTA measurements can be found on pages 361–93 of vol. 4, Organic Analysis, published by Interscience Publishers, New York, N.Y. (1960).

In the drawings, FIGURES I through IX are graphic illustrations of differential thermal analyses of prepolymers and polymers prepared in accordance with the method of this invention as compared with prepolymers and polymers prepared by prior methods. The figures will be more fully discussed hereinafter but, by way of identification, the figures show the following information (the abbreviation PET represents poly (ethylene terephthalate), either as a prepolymer or as a built-up polymer):

FIG. I—DTA curve for built-up PET polymer having lower initial melting point, made from prepolymer as in FIG. IV. See Table II and FIG. V. This is similar to dash and dot curve in FIG. VIII.

FIG. II—DTA curve after molten PET prepolymer is quenched in cold liquid to make it amorphous.

FIG. III—Build-up rate for solid phase polymerization of PET prepolymer not made by process of invention. See Table I, FIG. VI and FIG. IX.

FIG. IV—DTA curve for PET prepolymer having enlarged locked-in amorphous fraction and no amorphous fraction crystallizing below 220° C. The broken line curve is superimposed from FIG. II for comparison. See Table II and FIG. V.

FIG. V—Build-up for solid phase polymerization of PET prepolymer having enlarged locked-in amorphous fraction. See Table II and FIG. IV. Broken line is curve from FIG. III for comparison.

FIG. VI—DTA curve for PET prepolymer cooled from melt by process not covered by invention but having some locked-in amorphous fraction with remaining amorphous fraction crystallized below 220° C. See FIG. III and FIG. IX.

FIG. VIII—DTA curve for PET prepolymer as used in FIG. IV is shown by solid line. Broken line is for same prepolymer after being held at 218° C. under non-polymerizing conditions in an inert atmosphere to test stability of locked in amorphous fraction.

FIG. VIII—Solid line shows DTA curve for PET prepolymer similar to FIG. IV.

Broken line shows DTA curve for same prepolymer after one hour of solid phase polymerization. See Table II.

Dash and dot line shows DTA curve for same prepolymer after 4.2 hours of solid phase polymerization. See Table II. This is similar to FIG. I.

FIG. IX—DTA curve for built-up PET polymer after solid phase polymerization, for 4.2 hours, for prepolymer shown by FIG. VI. See Table I and FIG. III.

*Preparation of polymer*

As indicated above, the successful production of a highly reactive polyester polymer is dependent on (A) the manner of carrying out and controlling the ester exchange and melt polymerization reaction, (B) the intrinsic viscosity of the prepolymer and (C) the thermal treatment of the prepolymer during melt polymerization and the cooling treatment of the prepolymer immediately prior to powder polymerization.

In accordance with (A), above, it has been found that successful preparation of prepolymer is indicated by the extent of completion of the ester exchange reaction and the elimination of side reactions during the ester exchange so that the prepolymer does not contain contaminants, such as residual carboxyl groups, produced by such side reaction. It is important that, contrary to prior concepts, refluxing of the reactants must be kept to a minimum since the reactants are not in contact with each other or with catalyst during reflux. Further, to maintain the catalyst at a high rate of activity and to force the reaction to completion, it is important that the methanol which is formed be removed as rapidly as possible. This will become apparent to those skilled in the art by reference to the following schematic representation of the ester exchange equilibrium reaction:

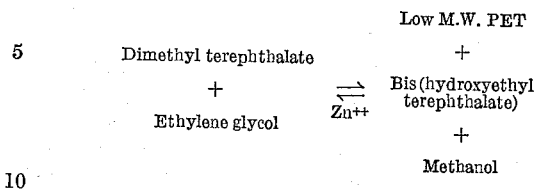

Thus, it is seen that removal (i.e. nonreflux) of methanol is essential in order to force the reaction to completion.

Similarly, in the melt polymerization of the low M.W. PET produced as a result of the ester exchange reaction, it is imperative that the glycol formed is removed and not returned (i.e. refluxed). This, also, will become apparent by reference to the following schematic melt polymerization equilibrium reaction:

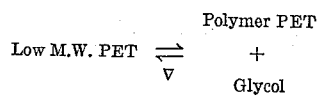

In order to efficiently prepare low M.W. PET having a minimum of side reaction contaminants, this invention therefore employs a two-step sequential reaction process, without intervening cooling, substantially comprising the following steps: (1) reacting, in the first of a sequence of two distinctly operated reaction zones, about one mole proportion of a lower dialkyl ester of a bifunctional dicarboxylic acid, from about 1.3 to 2.5 mole proportions of a glycol and an ester exchange catalyst, this first reaction zone comprising a heated receptacle and a fractionating column under a pressure of from about one to three atmospheres operated in equilibrium at temperatures which are continuously increased, within the range of about 150°–225° C., so as to rapidly remove the formed lower alcohol from the column while condensing substantially all of the glycol which enters the column and returning it to the receptacle along with other condensed reactants in the column including the dicarboxylic acid and it mono and diesters, said operation being completed in the first reaction zone when substantially all of the alcohol has been removed, and (2) immediately, and without allowing intervening cooling, continuing the reaction in a second reaction zone comprising a heated receptacle and glycol vapor removal and condensing means connected to a pressure reducing means operated at gradually diminished pressure and at a temperature above the melting point of the contents of the reaction zone, which temperature is gradually increased to not more than about 20° C. higher than the melting point of the prepolymer being produced, said operation being conducted at a pressure which is gradually reduced to less than 10 mm. of Hg such that glycol formed is substantially completely removed and the contents of the reaction zone are kept in a condition of turbulent flow by means of agitation until an intrinsic viscosity is reached which is from 0.10 to 0.20 unit less than a prescribed minimal built-up intrinsic viscosity, said reaction period being short of that at which there would be streamline flow of the contents. The ethylene terephthalate prepolymer produced is characterized by a melting point of about 250° C., a number average molecular weight of from about 2500 to about 12,000 and an I.V. of from about 0.33 to no more than about 0.45.

Various additional details for preparing this prepolymer, which advantageously contribute to the preparation of high quality product, involve the surprising discovery that the initial contents of the reaction vessel in step (1) may contain a maximum of 5% water, 3% terephthalic acid, and 10% methyl alcohol. It is advantageous that the dimethyl terephthalate, prior to use in step (1), be heated to at least 140° C. until it melts and is filtered through a microporous filter having a mean pore size of from 2 to 10 microns. Moreover, it is desirable that an inert atmosphere be established at the beginning of step (1) and at the beginning and end of step (2) while the pressure is being returned to atmospheric and the polymeric product is being expelled from the reaction vessel. The inert gas used can be a mixture of nitrogen and carbon dioxide containing a maximum of about 2% by volume of oxygen and a maximum of about 1% of carbon monoxide. Obviously, hydrogen, helium, or other inert gases may be used.

Advantageously, the ester-exchange catalyst is an organic compound of divalent manganese or zinc or of tetravalent titanium. Especially valuable titanium compounds are the lower titanium alkoxides (1–6 carbon atoms). Zinc acetate or manganese acetate (or another lower alkanoate) are also especially valuable catalytic compounds. These metallic compounds provide unusually efficacious catalytic behavior at the higher than usual temperatures used during the first stages of condensation. The metal can be present in an amount of from about 10 to 300 parts by weight of titanium or zinc, as such, per million parts by weight of the dialkyl diester. As a result of using such a catalyst, the gram equivalents of carboxyl end groups, as such, on polymer molecules per million grams of polymer never exceeds 50 during the process. Other catalysts can also be employed, as well as mixtures thereof, in order to provide improved catalysis for the polymerization build-up, e.g. antimony compounds and the like as shown in the prior art.

The jacketed vessel used in step (1) can be heated at gradually increasing temperatures according to the following program using the longer time periods when the lower temperatures are employed:

| Heat-exchange fluid temperature (° C.): | Time period (hours) |
|---|---|
| 200°–220° | Start |
| 200°–230° | 3.0–1.0 |
| 220°–235° | 1.0–0.25 |
| 235°–250° | 1.0–0.25 |
| 240°–250° | 0.5–0.1 |
| 240°–255° | 2.0–0.5 |
| Time totals | 7.5–2.1 |

The heating in step (1), of the sequential reaction process described above, is desirably maintained about 197° C. but below a temperature which initiates refluxing and the column advantageously contains sufficient packing material or plates so that any sublimed dimethyl terephthalate is condensed in the packing or on the plates and is therefore substantially completely washed back into said reaction vessel by any refluxing ethylene glycol, while the methyl alcohol vapor passes through the column. Most of that small amount of methyl alcohol which condenses in the upper portion of the column flows down through the column and is vaporized by heat from that part of the column where ethylene glycol is condensing. Upon completion of step (1) the protopolymeric reaction mixture is advantageously passed through a microporous filter having a mean pore size of from about 3 to 25 microns prior to continuing with step (2).

The jacketed vessel used in step (2) can be heated at increasing temperatures and decreasing pressures according to the following program using the longer time periods when the lower temperatures and higher pressures are employed:

| Pressure (mm. Hg) | Heat-Exchange Fluid Temperature (° C.) | Time Period (Hours) |
|---|---|---|
| Atmos | 250–275 | Start |
| 400–760 | 260–280 | 0.5–0.1 |
| 10–400 | 270–280 | 0.5–0.1 |
| <10 | 270–280 | 1.5–1.0 |
| Time Totals | | 2.5–1.2 |

The heating program in step (2) can be at first conducted using a reduced pressure such as provided by conventional aspiration while at least 80 mole percent of that ethylene glycol which is in excess of one mole proportion is removed, and the pressure is then reduced gradually to less than 10 mm. and preferably less than 5 mm. of Hg pressure in not less than 30 minutes.

It is convenient to use either a packed column or one with plates in both steps (1) and (2) which column is connected to a condenser in both instances. If desired, the same apparatus can be used for both steps in which case the transition occurs when the temperature is raised and pressure reduced.

It is convenient to determine the end of step (2) by measuring the torque required to effect the agitation and when the torque corresponds to a predetermined intrinsic viscosity of from 0.33 to 0.43, preferably about 0.38, the vacuum is broken with inert gas, such termination being accomplished while the agitated contents of the reaction vessel are still characterized by turbulent flow. The ethylene glycol removed during step (2), including methyl alcohol dissolved therein, can be recycled for subsequent use in step (1).

In accordance with (B), above, interpretation of DTA curves shows that prepolymers of a higher I.V. have greater reactivity during the solid phase polymerization. Thus, it has been observed that polymers prepared by the solid phase polymerization of prepolymers have a characteristic of approaching a limiting value of molecular weight. If the polymer is remelted and again powder polymerized, a new limiting and either lower or higher molecular weight can be approached. Such a procedure of course, is not practical because of increased color, and added costs, among other factors. Thus, each prepolymer powder can only be polymerized to a certain limiting value of molecular weight. Extending the reaction time produced but small changes in the intrinsic viscosity of the final polymer. This is shown in Table I and FIG. III.

TABLE I.—LIMITING MOLECULAR WEIGHT OF POLY (ETHYLENE TEREPHTHALATE) POLYMERIZED BY SOLID PHASE POLYMERIZATION

| Reaction time, hr. | Reaction Temp., ° C. | Intrinsic Viscosity |
|---|---|---|
| Original | Room temperature | 0.38 |
| 0 | 210 | 0.39 |
| 0.5 | 219 | 0.42 |
| 1.0 | 220 | 0.47 |
| 1.5 | 217 | 0.49 |
| 2.5 | 220 | 0.50 |
| 3.8 | 221 | 0.52 |

Raising the intrinsic viscosity of the prepolymer shifts the build-up curve shown in FIG. III to a parallel and high level. There is, however, an upper limitation here because the prepolymer grinds with greater difficulty at increasing intrinsic viscosities. In addition, excessive frictional heat in a grinder can cause undesirable color in the prepolymer if dry grinding techniques are used. Powder temperatures in the grinder which approach the melting point of prepolymer; e.g., above 200° C., allow the prepolymer to discolor in air and turn brown. To avoid this, it was found that an intrinsic viscosity of about 0.40 is limiting on the particle reduction step using dry grinding. A top limit is about 0.43, unless very slow grinding with special cooling is undertaken. This is due to the increase in physical properties as the molecular weight increases. When the intrinsic viscosity of the prepolymer reaches about 0.5, the rate of increase of physical strength properties in the prepolymer becomes much less, approaching those found in many end products. In the same manner, even wet grinding of prepolymer is limited by the high strength of prepolymer, and hence lower intrinsic viscosity is preferred for this operation.

Accordingly, as will be discussed hereinafter, when a low molecular weight poly(ethylene terephthalate) prepolymer, having an intrinsic viscosity of about 0.38 (0.33–0.45), is cooled from a melted condition in a particular manner, it is possible to produce a nearly colorless solid prepolymer which ranges widely in reactivity when polymerized or built-up by solid phase techniques. Only this prepolymer intrinsic viscosity range (i.e., 0.33–0.45) is operative to enable subsequent solid phase polymerization to produce a nearly colorless poly(ethylene terephthalate) product which melts at 250–264° C. and which has an I.V. of at least 0.5, such I.V. being satisfactory for normally useful products. Below this range, viz below 0.33, the prepolymers must be polymerized at such high temperature, e.g., at least 240° C., that excessive thermal degradation (as exhibited by poor color) results. Thus, as indicated hereinbefore, if the melt polymerization to make prepolymer is continued beyond the upper range value of intrinsic viscosity, viz above about 0.43, the removal of ethylene glycol becomes increasingly slower due to higher melt viscosity and degree of polymerization of this reaction. Thus, at 275–280° C. thermal degradation and color increase markedly. If, however, the melt polymerization is stopped at a point in time when the melt viscosity is still relatively low and the removal of glycol is still reasonably rapid, little color is introduced into the prepolymer.

Most importantly, and in accordance with (C), above, it has further been discovered that the reactivity of a polyester prepolymer can be greatly increased if the prepolymer melt is solidified in such a manner as to include an adequate amorphous fraction which does not crystallize until the prepolymer powder approaches the melting point. In appearance such a prepolymer is opaque and brittle, lending itself to particle size reduction in commercial equipment. The characteristic of such a powder is shown by the differential thermal analysis curve, FIG. IV. Note that the prepolymer when heated from room temperature to about 220° C. neither emits heat, which it would if it were crystallizing, nor absorbs heat, if it were melting. Yet as the sample starts to melt, an amorphous fraction starts to crystallize. The dotted line corresponds to that part of the curve which is obtained if this melted prepolymer is quenched and treated exactly like that of FIG. II. This area between the two curves is a measure of the advantageously desired disorganized state within the powder particles, viz a "locked-in" amorphous fraction.

In the aforesaid generic description of the valuable prepolymers of the present invention the term "characteristic melting point" was utilized. This term is intended herein to mean the so-called "normal" melting point of the particular prepolymer, which is obtained, reproducably, by simply melting the prepolymer, "quenching" the resulting molten material to a temperature below about 230° C. within an extremely short time (i.e., less than about 5 seconds), and then determining the point at which the resulting solidified material melts by any of the conventional means for determining the melting points of polymers (including DTA.). Note that the prepolymers of the present invention (having the unexpected increased reactivity described herein) always display melting points that are significantly lower (i.e., at least about 2° C., and preferably at least about 5° C. lower) than the "characteristic" melting point of the prepolymer. Thus, in order to determine whether or not a given prepolymer has been made in accordance with the processes of the present invention, one needs simply to (a) determine the apparent melting point of the prepolymer via one of the usual techniques, such as via DTA. analysis;
(b) "quench" the resulting molten prepolymer by cooling it suddenly, as detailed above, and
(c) determine the melting point of the resulting solidified prepolymer.

(Steps (b) and (c) always yield a prepolymer product having the "characteristic melting point" of that particular material.) If the "apparent" (original) melting point of the prepolymer in question [i.e., that found in step (a), above] is significantly lower than its "characteristic" melting point [i.e., that found in step (c), above], then the prepolymer is the valuable, "activated" material of the present invention; whereas, if the original melting point from step (a) of the prepolymer sample is not significantly lower than that resulting from step (c), the prepolymer in question is of the conventional, less reactive type.

When the improved prepolymer powder, made according to this invention, is polymerized under the same conditions as those used to obtain the data set out in Table I, a significantly increased polymerization rate results. Typical results of such improved processes are shown in Table II and FIG. V. It should be noted that even Table I and FIGS. VI and IX are not fully representative of what the prior art would lead those skilled in the art to expect, since such persons would normally quench the prepolymer in a cold liquid (see FIG. II) and the results would be even less acceptable than those shown by Table I and FIGS. VI and IX.

TABLE II.—SOLID PHASE POLYMERIZATION OF PREPOLYMER WITH DTA CURVE OF FIGURE IV

| Reaction time, hr. | Reaction temp., ° C. | Intrinsic Viscosity |
| --- | --- | --- |
| Original | Room temperature | 0.38 |
| 0.0 | 210 | 0.42 |
| 0.5 | 219 | 0.47 |
| 1.0 | 222 | 0.57 |
| 1.5 | 221 | 0.64 |
| 3.0 | 220 | 0.68 |
| 4.2 | 220 | 0.73 |

Thus, in one embodiment of the present invention, higher reactivity of the prepolymer is achieved when a prepolymer melt having an I.V. suitable for pulverization is cast, at a definite temperature above its melting point, onto a stainless steel tray or belt or other metal surface to a depth of about 0.5 inch and allowed to cool at room temperature, with the added feature that the underside of the metal surface may be temperature controlled. Thus, the prepolymer cools at a rate such that the surfaces of the melt solidify first, thereby cutting down the heat dissipation from the molten mass so that the mass cools slowly. Since the mass is cooler on the surface it does not oxidize appreciably; moreover, the cooler crust protects the molten mass from coming into contact with air and discoloring. On further cooling the resulting cooled prepolymer is brittle and essentially free of color. When this is done, a prepolymer with the reactivity shown in Table II and FIGS. IV and V is obtained.

It was discovered that a poly(ethylene terephthalate) prepolymer melt would not solidify as a uniformly brittle cake if the original melt temperature was much higher than about 265° C. The best results are obtained near the freezing point of the melt, such as 258° C. When the prepolymer melt is cast at too high a temperature, an excessive amount of undesired, heterogeneously distributed amorphous material is formed. Among other things, this makes it increasingly difficult to reduce the material to a powder size that is adaptable to satisfactory solid phase polymerization. (See FIG. VI.)

It was further discovered that, if such a material were made, consisting of a relatively smaller proportion of brittle (crystalline) material and relatively more tough (amorphous) material and then reduced to a fine particle size, this material would crystallize further when heated above room temperature and below 220° C. The net result was that the amount of "locked-in" amorphous material, heat stable to 220° C. illustrated in FIG. IV, was actually reduced although more was present at the start. When this material was polymerized by solid phase techniques, its reactivity was correspondingly less and comparable to that shown in Table I and FIG. III, correlating with the reduced area of this fraction as shown by the differential thermal analysis curve, FIG. VI.

When it is cast in an air atmosphere, cast prepolymer mass must be approximately 0.5 inch thick. If too thin, an excessive amount of amorphous material is formed; if too thick, the prepolymer solid cracks on cooling, allowing air to discolor the cake. Hence, when prepolymer is cast at a thickness of about 0.5 inch and allowed to cool slowly (in the requisite required manner) in air, as previously described, its reaction rate for solid phase polymerization is greatly enhanced, as shown by FIGS. IV and V, and the prepolymer contains an amorphous fraction which is heat stable to about 200° C. as evaluated by differential thermal analysis. The greater the heat stable disorganized (i.e., amorphous) state within the cooled prepolymer, as shown by the differential thermal analysis curves, the greater is the reactivity of the prepolymer when subjected to solid phase polymerization techniques. When the phase in the disorganized state is heat stable to about 200° C., it is considered as "locked-in." This "locked-in" amorphous fraction is remarkably stable when the prepolymer is annealed at about 200° C. at atmospheric pressure in an inert atmosphere. This is shown by FIG. VII for a prepolymer that was held one hour at the temperature normally used during polymerization.

The necessary thickness of the cast prepolymer is ascertained by casting a number of batches of prepolymer, conducting a differential thermal analysis on each batch of prepolymer and then powder polymerizing each prepolymer and conducting a differential thermal analysis of the built-up polymer prepared from each batch of prepolymer. The correct thickness has been cast when (1) a batch of prepolymer, cooled in accordance with the invention, has a DTA curve showing an enlarged area of deviation from the DTA curve of a quenched prepolymer batch at a temperature between the melting point and 40° C. therebelow as illustrated in FIG. IV, such area of deviation indicating a locked-in amorphous fraction, and when (2) the DTA curve of the built-up polymer shows a single peak (i.e., crystalline melting point) at a lower temperature than the so-called "characteristic" crystalline melting point of the prepolymer prior to solid phase polymerization.

Thus, the "locked-in" amorphous fraction gradually disappears and the melting point correspondingly is lowered as the polymerization of the prepolymer is continued by solid phase techniques. This is shown by FIG. VIII. After conducting the polymerization for about 4 hours, as shown by the curve, the resulting polymer exhibits, to a large degree, an inability to polymerize further, correlating with the loss of the "locked-in" fraction. Note the difference in curve shapes for the annealed prepolymer held one hour at 218° C. and the same material polymerized one hour at 218° C. to the higher intrinsic viscosity of 0.57 (from 0.38).

Quite obviously, those skilled in the art will not have to prepare DTA curves for more than a few adjustment runs before the most advantageous manner will be ascertained for treating the prepolymer in accordance with the invention. The same treatment can thereafter be continued for subsequent batches as long as no changes are made in polymer composition. Of course, the treatment will differ for each species of polymer or modification thereof; hence the above described details directed to poly(ethylene terephthalate) are merely illustrative.

As explained hereinabove, the so-called "characteristic" crystalline melting point, of about 256° C., decreases during the solid phase polymerization. A larger amount of the "locked-in" amorphous fraction in the prepolymer correlates with the lowering of the melting point and the uniformity of the lowering. If the "locked-in" amorphous fraction is large, as shown by FIG. IV, then during solid phase polymerization the melting point shifts to that shown in FIG. I. *Note:* (1) the uniformity of the DTA curve shown in FIG. I in which there is one peak and (2) the shift of the peak from 256° C., shown in FIG. IV for prepolymer, to 246° C. shown in FIG. I for the polymerized powder. Apparently, the presence of a "locked-in" amorphous fraction in the prepolymer affects the stability of the crystal structure of the prepolymer. When this "activated" prepolymer is polymerized, the "locked-in" fraction disappears, while at the same time there appears a gradual downward shift of the crystalline melting point so that the built-up sample has a lower DTA melting point than the melting point measured by DTA for the prepolymer. The end result is a product powder which has the novel and unique characteristic of melting uniformly at a temperature lower than the normal crystalline melting point of the prepolymer and lower than conventional polymer. As shown in FIG. II for such polyesters, a value of 259° C. would be indicated as the conventional crystalline melting point.

Hence, there is indicated an advantageously greater reaction rate when, as shown by this invention, the prepolymer melt is cast in such a way as to retain a heat stable, "locked-in" amorphous fraction which allows the crystalline melting point by DTA measurement to be changed to a lower value while this amorphous fraction disappears during polymerization. It is important that this fraction is large enough so that its final effect is such as to give a built-up product that exhibits uniform melting at the lower value when measured by DTA. In other words, optimum reactivity is characterized, as set forth supra, by a single peak in the DTA curve at a lower temperature than measured by DTA for the prepolymer, i.e., when DTA analysis indicates a lower melting point for the polymer than for the prepolymer.

Thus, this preferred embodiment of the invention provides an improved manner of treating the prepolymer, prepared as above-described, which specifically comprises (1) casting upon an inert metal surface a molten mass of the prepolymer about 5–35 mm. thick at a temperature no more than about 10° C. above its melting point, the prepolymer having an intrinsic viscosity of at most about 0.05 unit below the maximum tolerable intrinsic viscosity above which solidified prepolymer cannot be pulverized by dry grinding without substantial degradation and discoloration [for poly(ethylene terephthalate) this is about 0.45], the intrinsic viscosity being at least 0.10 unit below that of the built-up form to be obtained [within the range of from about 0.33 to about 0.45 for poly(ethylene terephthalate)], (2) cooling the resulting molten mass of prepolymer on the metal surface by overhead impingement with a cooling gas while the metal surface is kept, by cooling, at an underside temperature of no more than about 90° C. at the point of first contact with prepolymer to no less than about 10° C. at last contact, until a crust forms upon the molten mass and the maximum temperature inside the mass is reduced to less than about 125° C. within not less than about 1 minute and no more than about 5 minutes and (3) pulverizing the solidified mass of prepolymer to a powder of which substantially all passes a U.S. Standard 20 mesh screen.

Still other manipulative procedures can be utilized in the successful practice of the present invention. The critical conditions set out above for cooling the molten prepolymer can be met, for example, by pouring the molten prepolymer onto a series of metal or rigid, heat resistant plastic trays that are moved continuously through the stream of melted prepolymer flowing from the reactor. As soon as each tray is filled, it can then be subjected to cooling conditions whereby the requisite "crust" is formed and the temperature of the prepolymer mass is lowered in accordance with the conditions set out above. Proper cooling of the trays can be obtained, for example, by passing them continuously through on enclosed, refrigerated area along the production line.

The molten prepolymer can also be sprayed via conventional procedures, in the form of fairly large droplets, into an atmosphere that is slightly below the melting point of the prepolymer. Thus, the requisite "crust" is formed practically immediately on the surfaces of the droplets. The encrusted droplets can then be introduced into a still colder zone (for example, a zone in which cooler gas, at a temperature below about 100° C., is blown over and around the encrusted droplets) whereby the temperature of the prepolymer mass within the droplets is reduced to below about 125° C. within 1–5 minutes.

Still another way in which the requisite cooling conditions can be obtained is by stirring molten prepolymer into a hot conevntional heat exchange material, such as chlorinated biphenyl, that is a mobile fluid at temperatures of 20–300° C. to thereby form an emulsion of droplets of molten prepolymer (initially not more than about 10° C. above the melting point of the prepolymer) in the liquid heat exchange medium. The temperature of the resulting emulsion is then immediately lowered to about 10° C. below the melting point of the prepolymer to cause the formation (on the surfaces of the dispersed prepolymer droplets) the requisite "crust." Then the emulsion is passed quickly through a heat exchanger so that the temperature of the continuous phase (heat exchange medium) is suddenly lowered to about 100° C. which temperature is then maintained as closely as possible by continuous removal of heat from the continuous phase. The net effect of such temperature control and regulation is that the temperature of the prepolymer mass (within the dispersed droplets) is lowered to below about 125° C. within the requisite period of time. The foregoing specific examples of various manipulative procedures whereby the conditions required for the successful practice of this invention can be followed are offered to demonstrate that the successful "activation" of the prepolymer in accordance herewith is essentially independent of the particular manipulative procedures that are utilized to obtain the necessary controlled conditions, as set out in detail hereinbefore.

The "crust" that is referred to above can be described as being cloudy or hazy to stark white in appearance (as compared with the practically completely clear molten prepolymer as it is poured from the prepolymer reactor onto the cooling area). It is tough, but it can be punctured readily with a sharp object, and the clear molten material beneath the crust can then be observed. It is believed that crystals and crystal nucleii cause the initial haziness or cloudiness, with the stark white appearance being due to the further cooling and additional crystal growth in the "crust" area. Of course, if the prepolymer is tinted or pigmented, the "crust" will be the color of the tint or pigment, rather than being white.

*Solid phase polymerization of prepolymer*

The preceding aspects of the present invention have dealt with the preparation of the polyester prepolymer, the melt polymerization of same and the treatment of the molten prepolymer.

The critical feature of this aspect of the invention is the proper selection of the following factors: (1) prepolymer I.V., (2) prepolymer cake thickness and (3) manner of cooling the prepolymer cake. It was quite unobvious to discover that these three factors had such a significant affect upon the subsequent powder build-up process and the properties of the built-up polymer. It is difficult to specifically define these factors for polyesters in general, except to state that these three factors must be adjusted so that the pulverized prepolymer can be built-up to a polymer having an increased I.V. value of at least 0.10 additional unit in no more than about 8 hours and preferably less than about 5 hours at a temperature of from about 25° C. below to about 75° C. below the crystalline melting point of the prepolymer particles, and the built-up polymer obtained has a lower crystalline melting point, as measured by DTA, than the normal value for such polymer and has substantially no discoloration. As a reasonably applicable general statement, it can be considered that the desired prepolymer I.V. will be about 0.10 to 0.20 unit less than the minimum I.V. of the built-up polymer which, when melt-extruded to form a fiber and cold drawn about three times its original length, will have approximately its maximum physical properties. For poly(ethylene terephthalate) this minimum built-up polymer I.V. value is about 0.5–0.55. Accordingly the described prepolymer I.V. value, by the present definition, would preferably lie between 0.30 and 0.45. As already pointed out, this value is more appropriately considered to be between 0.33 and 0.43. The particular value in this range which is most advantageous is the maximum tolerable I.V. at which solidified prepolymer can be pulverized without substantial degradation and discoloration. Most advantageously, such grinding is dry grinding so as to avoid the necessity of removing any wetting agent, such as water or an organic liquid. In other words, it is ordinarily expected that the intrinsic viscosity of the polyester will be increased by at least about 0.10 unit during the "solid phase" portion of the overall polymerization processes described herein. Generally this increase will be from about 0.1 to about 0.2 unit; however, increases (in intrinsic viscosity) of more than 0.2 unit during this "solid phase" reaction period are not uncommon. For this reason, the statements herein that the intrinsic viscosity of the present prepolymers should be about 0.1 to 0.2 unit less than the desired intrinsic viscosity of the ultimate polyester product are offered only as a minimal guideline, and are not intended to infer that increases of greater than 0.2 unit in intrinsic viscosity either cannot or would not be expected to occur during subsequent "solid phase" operations (i.e., in the hot fluidized bed).

It is advantageous that the cooled prepolymer be comminuted to particles of sizes retained on screens of the following mesh sizes:

| Percent by weight of particles on screen: | Screen mesh size |
|---|---|
| 0 | 20 |
| <0.5 | 40 |
| <2.0 | 60 |
| <10 | 80 |
| <20 | 100 |
| <40 | 200 |
| <40 | Thru 200 | so at least 98% of the particles pass thru a 40 mesh screen whereby all particles of the built-up polyester subsequently produced will have an essentially uniform intrinsic viscosity wth a range among the particles of no more than about 0.05 unit and usually much less.

The heating during the solid phase build-up can advantageously be accomplished in a jacketed vessel, preferably in an inert atmosphere such as helium, argon, nitrogen, $CO_2$ and the like, heated with a heat-exchange fluid having a temperature of about 200–245° C., the particles in the vessel being agitated by moving a scraping device along the internal heated surfaces of the vessel but about 0.01 to 1.0 inch away from the internal surfaces, the scraping device moving at from about 1 to 50 ft./min. at the points nearest the surfaces. This jacketed vessel can be operated either (A) at substantially atmospheric pressure while moving an inert gas at 150°–250° C. therethrough, in order to remove diol from the reaction, or (B) under a pressure of less than 1000 or preferably less than 150 microns of Hg. The built-up polyester particles can advantageously be removed from the vessel by breaking the vacuum with inert gas and transferring the particles of polyester to a storage receptacle under an inert gas. Advantageously the cooling and storing are in the absence of water.

As already described, the solid phase polymerization build-up process comprises heating solid particles of the prepolymer of a size substantially completely passing through a 20 mesh screen in an inert atmosphere under conditions whereby the particles remain substantially free-flowing and at a temperature of from about 25° to 75° C. below the crystalline melting point of said particles. By proceeding in such manner, a polyester is produced having a molecular weight at least in the range of 14,000 to 50,000, an intrinsic viscosity of at least 0.5–1.5, and having less than 30 gram equivalents of carboxyl end groups per million grams of polyester.

Finer particle sizes also aid build-up rate. There are, however, limitations due to excessive dusting that occurs during preheating, polymerization and cooling of the polyester powder.

Increased reaction temperatures also increase the polymerization rate. However, thermal degradation increases rapidly with temperature, leading to undesirable color levels in the final product. In addition, as the powder starts to melt at temperatures above 220° C., as shown in FIGS. I and II, agglomeration of the powder occurs making it increasingly impractical to have an agitated powder during the preheating, polymerization and cooling cycles. If the powder is not agitated, then the heat transfer is too low for practical polymerization operations.

The higher reaction rates achieved by the process of this invention allow shorter reaction times to be used, resulting in less thermal degradation and improved color. At least equally important, this improvement allows the process to be made more practicable in that a margin of safety is acquired with regard to the desired intrinsic viscosity of product, since the upper limit within a reasonable time, such as 4 hours, will be as great as is now known to be desired. This is especially true for extruded poly(ethylene terephthalate) which must have a minimum intrinsic viscosity of about 0.5 to have advantageous physical properties and which can be stretched and heat set for dimensional stability. It is desirable, therefore, to prepare a build-up polymer powder product which, prior to extrusion, has an intrinsic viscosity of at least 0.60 and preferably higher. Extrusion practice varies, but some loss in polymer molecular weight is to be expected from remelting of the polymer powder. Thus, a preferred intrinsic viscosity of poly(ethylene terephthalate) powder is about 0.70.

Further details of solid phase polymerization, including the use of fluidization, are illustrated in copending applications by Russin, Kibler and Barkey, Ser. No. 457,-216 filed May 19, 1965, and by U.S. Patent 3,075,952 issued to Coover, Joyner and Shearer and U.S. Patent 3,117,950 issued to Kibler, Russin and Bell. As can be seen from this patent application and these patents, the group of researchers in this field working in the laboratories of their common assignee include, among others, Russin, Kibler, Coover, Joyner, Shearer, and Bell as well as the inventor herein.

As specific examples to further illustrate the invention, the procedures described hereinabove were used to prepare a prepolymer having an I.V. of about 0.38, which was built-up to polymer of I.V. about 0.70 and evaluated as shown by the indicated data.

EXAMPLE I

Into a fifty gallon vessel, equipped with an agitator and jacketed for heating its contents, there was introduced the following materials:

Dimethyl terephthalate, DMT _____ pounds__ 100
Ethylene glycol, corresponding to a mole ratio of ethylene glycol to DMT of 1.72 to 1.00 ___do____ 55
Zinc acetate dihydrate, corresponding to 65 p.p.m. of zinc _____ grams__ 10
Antimony trioxide, corresponding to 230 p.p.m. of antimony _____ do____ 12.5

Heat was applied to the vessel to retain good control of the reaction. The vapors were handled in such a manner as to allow all of the methanol to be removed as rapidly as formed; in a similar manner DMT and ethylene glycol were returned to the reaction vessel. High kinetic second order rate constants, i.e., >1.0 at 190° C. (374° F.), which increase as the reaction temperatures increase, i.e., high energy of activation such as 26 kcal./mole, are measurements which result when the ester exchange reaction is operated according to the principles outlined previously.

| Time, hr. | Average Reaction Temp., °F. | Average 1,800/°F., 1,000/°T. | Methanol Removed, lb. | Extent of Reaction | Cumulative Average Extent of Reaction, P | Apparent Kinetic Rate Constant, K×10⁴ |
|---|---|---|---|---|---|---|
| 0 | 350 | | 0 | 0 | 0 | |
| 0.25 | 352.5 | 2.215 | 8.5 | 0.258 | 0.129 | 2.1 |
| 0.5 | 361 | 2.192 | 15.25 | 0.462 | 0.360 | 2.6 |
| 0.75 | 371 | 2.166 | 21.0 | 0.636 | 0.549 | 3.7 |
| 1.00 | 380 | 2.143 | 25.75 | 0.780 | 0.708 | 5.4 |
| 1.25 | 396 | 2.103 | 29.25 | 0.886 | 0.833 | 8.0 |
| 1.50 | 411 | 2.067 | 31 | 0.939 | 0.913 | 8.4 |
| 1.75 | 422.5 | 2.040 | 32.75 | 0.992 | 0.966 | 22.6 |
| | | | 33.00 | 1.00 | | | where $dp/dt = K(1-p)(B-p)$, rate of reaction per mole $= dp/dt$ and B=mole ratio of EG/DMT The apparent rate constant at 190° C. (374° F.) is 4.3 and the energy of activation from plot of $K \times 10^4$ vs. $1,000/T$ of 26 kcal./mole indicate a high level of performing the ester exchange reaction. This is confirmed by the short reaction time.

The ester exchange reaction, nearly completed at the 99.2 percent level, was continued in a vacuum type prepolymer reactor. Excess of ethylene glycol was removed at atmospheric pressure as the reaction temperature was increased to 490° F. (255° C.). The pressure was reduced slowly until full vacuum was obtained after sixty minutes (2,500 microns pressure). The reaction temperature was controlled near the freezing point so the final temperature was 256° F.

| Reaction Time at Full Vacuum, Min. | Pressure, Microns | Torque Measurement, 100 as base | Reaction Temperature | |
|---|---|---|---|---|
| | | | °F. | °C. |
| 0 | 2,500 | 100 | 488 | 253 |
| 10 | 1,000 | 108 | 490 | 254 |
| 20 | 225 | 108 | 492 | 256 |
| 30 | 500 | 112 | 496 | 258 |
| 40 | 1,500 | 120 | 496 | 258 |
| 50 | 2,000 | 145 | 492 | 256 |

The pressure was brought back to atmospheric with nitrogen. The batch was cast onto a stainless steel belt in the manner previously described, cooled, and ground to a fine powder prior to fluidization. Effects from prepolymer temperature at 492° F. (256° C.), which is near the freezing point, and casting were judged by the DTA curves during build-up and the actual high reactivity obtained during solid phase polymerization by fluidization. Inert gas was passed through the powder at 215° C. The essential data are listed:

Initial prepolymer:
    Intrinsic viscosity _____ 0.42.
    Melting point _____ 258° C.
    Color value _____ 18.5, based on zero color at 14.0.
    Carboxyl, eq./$10^6$ g. ____ 24.

| Hours Reaction | Powder Temperature, °C. | Intrinsic Viscosity | DTA Peak Temp. | |
|---|---|---|---|---|
| | | | High Temp. | Low Temp. |
| 0 | 215 | 0.42 | [1] 258 | [2] 239 |
| 2 | 215 | 0.71 | [3] 253 | [3] 240 |
| 6 | 215 | 1.03 | [4] | [5] 245 |
| 66 | 215 | 1.43 | [4] | [5] 250 |

[1] Major peak.
[2] Minor peak.
[3] Equal peak.
[4] No peak.
[5] Single peak.

The single DTA peak at a lower temperature, which is retained to a surprising degree even after 66 hours of polymerization, illustrates the discovery of the combined factors that give high reactivity during solid phase polymerization.

The same prepolymer was polymerized separately to give the final product properties prior to extrusion into useful films or fibers.

Polymer:
    Pounds _____ 100.
    Intrinsic viscosity ___ 0.75 (3 hours' reaction time in vacuum polymer reactor at 215° C.).
    Melting point _____ 261° C.
    Color value _____ 22.0, based on zero color at 14.0. A value below 30 gives film for satisfactory commercial usage.
    Carboxyl, eq./$10^6$ g. _ 20.

High reactivity makes solid phase polymerization reaction cycles practical in fluidizing or vacuum equipment. Melting points, as determined with the Fisher-Johns apparatus for materials melted previously to destroy the previous thermal histories shown by the DTA thermograms, remain in the 258–260° C. range for poly(ethylene terephthalate) being polymerized. The DTA peak temperatures correlate with eactivity which is a result of the previously described factors.

EXAMPLE 2

To obtain data for the DTA curves of FIGURE VIII, a 100 gram sample of the above-described prepolymer was polymerized at atmospheric pressure in a fluidizer, using inert gas. The fluidizer is a device to maintain the powder in a suspended, fluidized condition while it is being heated and built-up. The fluidizer in this example was a 2 inch diameter vertical cylinder into which the inert gas was passed. The temperature was held at 220° C., and inert gas at 4 cubic ft./min. was used according to the following schedule. Time measurement was based on a starting temperature of above 200° C., hence some build-up may occur while this temperature is being reached since inert gas is also being passed into the fluidizer during this heating-up period.

| Time (hrs.) | Powder Temp., °C | Intrinsic Viscosity |
|---|---|---|
| 0 | 210 | 0.42 |
| 0.5 | 219 | 0.47 |
| 1.0 | 222 | 0.57 |
| 1.5 | 221 | 0.64 |
| 3.0 | 220 | 0.68 |
| 4.2 | 220 | 0.73 |

As mentioned above, this built-up polymer was one of those evaluated by the DTA technique as described herein.

As is apparent, the details of the above examples can be applied to any of the polymers discussed more generally hereinabove, and such details can be varied considerably, as for example, using a different catalyst system or using 1,4-cyclohexanedimethanol in lieu of ethylene glycol, or using 10% isophthalic ester in lieu of a part of the dimethyl terephthalate.

By means of this process for preparing prepolymer and built-up polymer, certain unique objective are achieved. Thus, by using a batch process it is possible to apply vacuum gradually (continuously), in contrast to a continuous process in which the vacuum would usually be applied stepwise. This allows the ester exchange step (1) and prepolymer step (2) reactors to be run in equilibrium. The distilling methanol and/or glycol is in equilibrium with the reflux in the column, to such a degree that essentially constant but minimum reflux ratios may be maintained.

The sequential batch process is also especially amenable to using less than the theoretical two moles of ethylene glycol per mole of dimethyl terephthalate whereby the temperature of the ester exchange reaction can be higher because the excess glycol, which boils at 197° C., soon becomes part of the protopolymer. With less glycol in the system, less glycol is available for distillation. As a result, the reaction is conducted at higher temperatures which overcomes the stoichiometric disadvantages of using less than theoretical amounts of glycol. There is, however, an advantage in having sufficient glycol in the column to prevent sublimation difficulties. With higher temperature reactions specified, a catalyst such as a titanium compound or a zinc compound is excellent for the ester-exchange reaction whereas at a lower temperature they would have much less activity. The titanium compounds are unique in that they catalyze the ester exchange in the presence of substantial amounts of carboxyl groups whereby up to 10% terephthalic acid can be used in lieu of dimethyl terephthalate before an appreciable effect is noted. This is apparently not true for $Zn^{++}$ or $Na^+$ ions as catalysts. A batch process provides time for carboxyl groups to react. The product made with 10% added terephthalic acid ended up with no more carboxyl groups than if no terephthalic was present. By employing melt phase reactions for steps (1) and (2) but not for final build-up it is thus possible to minimize the time at high temperature which causes poor color and degradation. It further permits stopping the reaction while turbulent flow still exists, thus avoiding all problems associated with the agitation of and the transfer of heat to viscous liquids (streamline flow, Reynolds Number less than 2,000). It has also been found that a prepolymer melt having an I.V. of about 0.33–0.43 does not stick to stainless steel. This allows a stainless steel belt to be used for cooling the prepolymer melt. The powder build-up reaction does not strain mechanical equipment. It allows polymers of high intrinsic viscosity to be made with no mechanical problems associated with viscous and streamline flow, in direct contrast to the continuous melt process.

An exemplary DTA curve is shown in FIG. 1 for a sample of polymerized poly(ethylene terephthalate) built-up to an I.V. of above 0.55 by the solid phase polymerization of prepolymer powder prepared by the process of this invention as illustrated in the above example. When the same or another prepolymer or polymer sample is held as a melt long enough to destroy crystal nuclei and then rapidly cooled to form an amorphous polymer, its differential thermal analysis curve is shown in FIG. II. This curve shows that at 75° C. the second order transition temperature (i.e. glass transition) is measured. This is the transition temperature between potential amrophous and crystalline states. It may be noted that changes in the specific heat of the sample, although very slight, account for the slight shift on the base line. In FIG. II this shift has been amplified. At about 110° C.

the amorphous sample starts to crystallize, giving off heat as shown by the large dip from the base line. Above about 140° C. the sample, now crystallized, once again merely acts like the inert sand. When the temperature reaches 220° C., the sample starts to melt, absorbing heat to again show a large temperature differential. At 259° C. the polymer is essentially completely melted, and the temperature differential then returns to zero, as shown by the curve returning to the base line. Under further heating, it would once again act like the inert sand. The temperature of 259° C. can be considered as the crystalline (or so-called "characteristic") melting point of the polyester as measured by differential thermal analysis.

It was further found that when a prepolymer of reduced reactivity and having the DTA curve of FIG. VI was polymerized by solid phase polymerization that the curve shown in FIG. I was not obtained. Actually, that curve shown in FIG. IX was obtained. Note the partial retention of the crystalline melting point fraction, and that only part of the polymer has shifted to the lower melting point. Hence, it was discovered that a prepolymer which does not polymerize at a more rapid rate exhibits a DTA melting curve that has two distinctly different DTA melting point peaks for the build-up polymers.

This discovery which can be measured, interpreted and graphically shown by differential thermal analysis curves, was most unexpected, and is significant since it demonstrates that the reactivity toward further polymerization can be controlled by changing the method of casting the prepolymer melt.

Studies, as discussed above, therefore confirm that an ordinary prepolymer of poly(ethylene terephthalate), prepared without recognition of the teaching of this invention as illustrated by the characteristics shown in FIGS. II and III, can be polymerized to higher intrinsic viscosities by solid phase polymerization techniques but only with poor results.

Thus, as illustrated above, by the process of this invention there is provided a prepolymer composed of bifunctional dicarboxylic acid and glycol constituents capable of being converted in the solid phase to a built-up linear polymer, such built-up polymer being characterized by having (1) a melting point above 150° C., (2) being orientable, (3) being crystallizable, (4) being capable of being formed into filaments which when cold-drawn show, by characteristic X-ray patterns, molecular orientation along the fiber axis, (5) by having not less than a minimal intrinsic viscosity above which its mechanical properties when cold drawn are not substantially improved, and (6) by having a lower melting point, as shown by its DTA curve, than the prepolymer from which it was prepared, such prepolymer being characterized by (A) having an intrinsic viscosity of about 0.10 to 0.20 less than said minimal intrinsic viscosity of the corresponding built-up polymer and not greater than that intrinsic viscosity above which dry grinding to particle sizes passing a 20 mesh screen would cause substantial discoloration, and (B) having a physical state comprising a combination of amorphous and crystalline phases associated together in a manner such that if the initial crystalline melting point of the prepolymer is measured, it will be lower than the so-called "characteristic" melting point of the prepolymer.

Illustrations of polymers which can be prepared and treated in accordance with the method of the invention include not only poly(ethylene terephthalate), which is the basis for the above-detailed description, but also such polyesters as poly(ethylene 2,6-naphthalate), poly(tetramethylene 1,2-ethane-p-dioxybenzoate), poly(ethylene 1,5-naphthalate), poly(1,4-cyclohexanedimethylene terephthalate), co-poly (90 to 98 mole percent ethylene terephthalate and 2 to 10 mole percent ethylene succinate), co-poly (90–98 mole percent 1,4-cyclohexanedimethylene terephthalate and 2 to 10 mole percent 1,4-cyclohexanedimethylene isophthalate), and the like.

Other useful bifunctional dicarboxylic acid constituents in such polymers include proportions such as 90 to 100 mole percent of an aromatic or nuclearly hydrogenated aromatic dicarboxylic acid as set forth in column 4 of U.S. Patent 2,720,502 in lines 15–51. Generally, no more than about 10 mole percent but sometimes a little more of these hexacarbocyclic bifunctional acids can be replaced with an aliphatic dibasic acid having 1 to 40 carbon atoms. Various illustrations are given in column 6 of U.S. Patent 2,901,466 which include glutaric acid, sulfonyldipivalic acid, dimethylmalonic acid, etc.

Other modifications include, as constituents, minor proportions of bifunctional hydroxycarboxylic acids and amino-carboxylic acids.

Various useful bifunctional diol constituents in such polymers are set forth in columns 6 and 7 of U.S. Patent 2,901,466. Other modifications include minor proportions of bifunctional diamines such as 1,6-hexamethylene diamine, 1,4-cyclohexanebismethylamine, etc., as well as bifunctional aminoalcohols such as 3-amino-2,2,4,4-tetramethylcyclobutanol, 4-aminobutanol, and the like. The diols and related constituents can have 2 to 40 carbon atoms and also include polymeric diols such as poly(ethylene glycol), poly(tetramethylene glycol) and hydroxyl terminated polyesters of aliphatic acids and glycols such as a polyester of adipic acid and neopentyl glycol terminated with hydroxyl radicals whereby it serves as a bifunctional diol. Such polymeric diols can have molecular weights up to about 4,000 and, generally, the polymers contemplated by this invention have as glycol constituents at least 90 mole percent of one glycol having from 2 to 12 carbon atoms and the necessary hydrogen and oxygen atoms to complete an aliphatic glycol structure, e.g., ethylene glycol, dodecamethylene glycol, neopentyl glycol, 1,4-cyclohexanedimethanol, 2,2,4,4-tetramethyl-1,3-cyclobutanediol, etc. The disclosure of U.S. Patent 2,901,466 illustrates such polymers. Another patent application is expected to cover the aspects of the present invention which are also pertinent to the solid phase polymerization of other linear condensation polymers such as the polyamides illustrated by poly(hexamethylene adipamide), poly(octamethylene sebacamide), polycaprolactam, poly(1,4 - cyclohexanebismethylamine adipamide), etc., as well as any other nylon polymers or other types of linear condensation polymers such as polycarbonates, polyureas, polyurethanes, and the like.

The invention has been described in considerable detail and with reference to specific embodiments thereof, but it is to be understood that variations and modifications can be effected within the spirit and scope of the invention as described above and as defined in the appended claims.

What is claimed is:

1. In a process for manufacturing a prepolymer which is a polyester of reactants composed of bifunctional dicarboxylic acid and glycol constituents and which has a melting point above 150° C. and increased reactivity when subjected to solid phase polymerization, which process comprises (a) initially forming a molten prepolymer having an intrinsic viscosity within the range of from about 0.1 to about 0.45 by reacting together said glycol and a lower alkyl diester of said dicarboxylic acid under conditions of minimum reflux and turbulent flow, (b) casting said molten prepolymer upon an inert surface, (c) cooling said molten prepolymer to thereby form a solidified prepolymer, and (d) subsequently pulverizing said solidified prepolymer;

the improvement which comprises in step (b), casting said molten prepolymer onto said inert surface to thereby form a layer having a thickness of from about 5 mm. to about 35 mm., and then cooling said layer in such a manner that a crust forms thereon and the maximum temperature within said layer is reduced to below about 125° C.

in from about 1 minute to about 5 minutes of the time said layer is cast; the temperature of said molten prepolymer being not more than 10° C. above the characteristic melting point of said prepolymer at the time of said casting.

2. An improved process as in claim 1, wherein said reactants are terephthalic acid and ethylene glycol, said inert surface is a metal belt, and the intrinsic viscosity of said prepolymer is within the range of from about 0.33 to about 0.45.

3. In a process for manufacturing a prepolymer which is a polyester of reactants composed of bifunctional dicarboxylic acid and glycol constituents and which has a melting point above 150° C. and increased reactivity when subjected to solid phase polymerization, which process comprises the steps of (a) reacting a di-lower alkyl ester of said acid and said glycol constituents in the first of a sequence of two distinct reaction zones under minimum reflux conditions and until alcohol formed during the reaction is substantially entirely removed from the reaction zone, (b) immediately, and without intervening cooling, continuing the reaction in the second of said reaction zones under conditions of turbulent flow until said prepolymer attains an intrinsic viscosity within the range of from about 0.1 to about 0.45, (c) forming a layer by casting the resulting molten mass of prepolymer upon an inert metal surface, (d) cooling said mass to thereby form solidified prepolymer, and (e) pulverizing said solidified prepolymer;

the improvement which comprises casting said molten mass at a temperature not more than 10° C. above the characteristic melting point of said prepolymer to form said layer; said layer having a thickness of from about 5 mm. to about 35 mm.; and slowly cooling said layer in such a manner that a crust forms thereon and the maximum temperature within the mass is reduced to less than about 125° C. within from about 1 minute to about 5 minutes of the time of said casting.

4. An improved process as in claim 3, wherein said reactants are terephthalic acid and ethylene glycol, said di-lower alkyl ester of said acid is dimethyl terephthalate, and the intrinsic viscosity of said prepolymer is from about 0.33 to about 0.45.

5. An improved process as in claim 3, wherein said cooling is carried out by contacting said mass by overhead impingement of a cooling gas while, at the same time, the underside of said metal surface is cooled during said contacting, whereby the temperature at the point of first contact of said metal surface with said molten prepolymer is at most about 90° C., and the temperature of the underside of said metal surface at the point of last contact is at least about 10° C.

6. A solid polyester prepolymer which is the product of the process of claim 1.

References Cited

UNITED STATES PATENTS

| | | | |
|---|---|---|---|
| 2,465,319 | 3/1949 | Whinfield et al. | 260—75 |
| 2,727,882 | 12/1955 | Vodonik | 260—75 |
| 2,758,915 | 8/1956 | Vodonik | 260—75 |
| 2,828,290 | 3/1958 | Caldwell | 260—75 |
| 2,901,466 | 8/1959 | Kibler et al. | 260—75 |
| 3,075,952 | 1/1963 | Coover et al. | 260—75 |
| 3,117,952 | 1/1964 | Kibler et al. | 260—75 |

FOREIGN PATENTS 614,625   12/1948   Great Britain.

WILLIAM H. SHORT, *Primary Examiner.*

L. P. QUAST, *Assistant Examiner.*